under 35
U.S.C. 154(b) by 0 days.

(12) United States Patent
Ohya et al.

(10) Patent No.: US 6,336,886 B1
(45) Date of Patent: Jan. 8, 2002

(54) DRIVE UNIT FOR CRAWLER WORKING VEHICLES (75) Inventors: Terumitsu Ohya, Osaka; Takanobu Shimada, Okayama, both of (JP)

(73) Assignee: Yanmar Agricultural Equipment Co., Osaka (JP)

( * ) Notice: Subject to any disclaimer, the term of this patent is extended or adjusted under 35 U.S.C. 154(b) by 0 days.

(21) Appl. No.: 09/423,515
(22) PCT Filed: May 13, 1998
(86) PCT No.: PCT/JP98/02126
  § 371 Date: Nov. 10, 1999
  § 102(e) Date: Nov. 10, 1999
(87) PCT Pub. No.: WO98/51523
  PCT Pub. Date: Nov. 19, 1998

(30) Foreign Application Priority Data

May 14, 1997 (JP) .............................. 9-124538

(51) Int. Cl.⁷ .............................................. B62D 11/06
(52) U.S. Cl. .............................. 475/23; 475/24; 475/28; 74/730.1
(58) Field of Search ............................. 475/23, 24, 28, 475/72, 74; 74/718, 720, 730.1

(56) References Cited

U.S. PATENT DOCUMENTS 3,392,602 A * 7/1968 Frost .......................... 475/28
4,164,155 A * 8/1979 Reed et al. ................... 475/24

FOREIGN PATENT DOCUMENTS

| JP | 64-44382 | 2/1989 |
| JP | 64-56279 | 3/1989 |
| JP | 08-156822 | 6/1996 |
| JP | 08-310434 | 11/1996 |
| JP | 09-142333 | 6/1997 |
| JP | 09-216570 | 8/1997 |
| JP | 10-95363 | 4/1998 |
| JP | 10-129516 | 5/1998 |

* cited by examiner

Primary Examiner—Sherry Estremsky
(74) Attorney, Agent, or Firm—Shanks & Herbert (57) ABSTRACT A drive unit provided with a power transmission path interlockingly connecting an engine (E) to left and right sprockets (12L, 12R), which are adapted to drive left and right crawlers (11) of left and right traveling parts (1L, 1R), via a non-stage traveling transmission unit (21) and an auxiliary traveling transmission unit (28) capable of changing the speed of a working vehicle in a plurality of stages. The power transmission path is provided with a non-stage steering transmission unit (20), left and right steering transmission units (48L, 48R) and left and right planetary gears (40L, 40R) all of which are adapted to be operated for speed change in accordance with a turning operation of a steering wheel (7). This construction enables a pivot turn and a spin turn of a working vehicle body to be made, the swinging performance of the working vehicle to be improved, the maneuvering of the vehicle to be done easily, and the construction of the drive unit to be simplified. It also becomes possible for the vehicle body to travel in a speed range which cannot be covered by the non-stage traveling transmission alone, and reduce the fuel consumption by lowering an output rotational frequency of the non-stage traveling transmission during a high-speed travel of the vehicle on a road.

4 Claims, 4 Drawing Sheets

DRIVE UNIT FOR CRAWLER WORKING VEHICLES

FIELD OF THE INVENTION

The present invention relates to a drive unit for crawler working vehicles, which can reduce the fuel consumption.

BACKGROUND TECHNOLOGY

Hitherto, an aspect of crawler working vehicles is known, which is configured so as to drive left and right traveling parts via a hydrostatically non-stage transmission unit and the speed can be changed in a non-stage while continuing the state in which the traveling power is being transmitted, thereby enhancing the traveling performance for traveling the vehicle on a non-paved road or the like.

Further, another aspect of crawler working vehicles is known, which is so configured as to turn the vehicle body by differing the traveling speeds of the left and right traveling parts from each other by driving the left and right traveling parts each by means of a non-stage transmission unit.

Said conventional crawler working vehicles, however, may suffer from the problems in that performance in traveling in a straight-forward traveling direction may become poor due to an individual difference in left and right non-stage transmission units, irregularity or damages of left and right operation mechanisms for operating the left and right non-stage transmission units or that a farm field surface may be damaged due to a rapid turning resulting from a non-associated control of the left and right non-stage transmission units.

Therefore, proposals have been made that the power from the traveling non-stage transmission units is transmitted to the left and right traveling parts through left and right planetary gear mechanisms and to drive the left and right traveling parts by means of the revolution of the planetary gears of the left and right planetary gear mechanisms by locating a steering non-stage transmission unit for changing the transmission ratio in association with a steering wheel to interlockingly couple the traveling non-stage transmission unit with internally-toothed gears of the left and right planetary gear mechanisms and by interlockingly coupling an output shaft of the steering non-stage transmission unit with left and right sun gears of the left and right planetary gear mechanisms, so as to rotate the left and right sun gears in the directions opposite to each other and further that the vehicle body is turned by differing the traveling speed of the left traveling part from that of the right traveling part by the pivotal operation of the steering wheel.

The conventional crawler working vehicles as described above, however, still have the disadvantages as will be illustrated hereinafter. More specifically, the such conventional crawler working vehicles lack economy in the fuel consumption during traveling on a paved road or the like at a high speed because an efficiency in the power transmission may be decreased rapidly as the number of output revolutions of the hydrostatically non-stage transmission unit becomes larger.

The above-mentioned drive units for the such crawler working vehicles suffer from the disadvantages that a difference in the traveling speeds of the left and right traveling parts is caused to occur regardless of the traveling speed of the vehicle body, so that there is the risk that, on the one hand, the traveling speed of the vehicle body may not be decreased and the vehicle body turns while maintaining its high speed and that, on the other hand, a quick turn may not be made because the vehicle turns while maintaining its low speed during the traveling at a low speed.

The present invention has the object to provide a drive unit for a crawler working vehicle, which can solve the disadvantages and the problems prevailing in the conventional drive units for crawler working vehicles.

DISCLOSURE OF THE INVENTION

The drive unit for a crawler working vehicle in accordance with the present invention, which has an engine interlockingly coupled with left and right sprockets through a traveling non-stage transmission unit and a traveling auxiliary transmission part capable of changing the speed of the vehicle in plural stages, the left and right sprockets being each configured so as to drive the left and right crawlers of the left and right traveling parts.

The drive unit according to the present invention still has the additional features as will be described hereinafter.

(1) The hydrostatically traveling power transmission path is formed between the engine and the left and right sprockets by interlockingly coupling the engine with the input shaft of the traveling non-stage transmission unit, the output shaft of the traveling non-stage transmission unit with the output shaft of the traveling auxiliary transmission part through a traveling clutch, and the output shaft of the traveling auxiliary transmission part with the left and right sprockets. On the other hand, the mechanically traveling power transmission path is formed between the engine and the left and right sprockets by interlockingly coupling the input shaft of the traveling non-stage transmission unit and the traveling auxiliary transmission part with a direct coupling clutch. With this configuration, the drive unit according to the present invention is so adapted as to transmit the traveling power by selecting either one of the hydrostatically traveling power transmission path and the mechanically traveling power transmission path by means of the connection operation or the disconnection operation of each of the clutches.

(2) The drive unit according to the present invention can implement the connection operation or the disconnection operation of each clutch by operating the forward-rearward speed change lever for changing the transmission ratio of the traveling non-stage transmission unit, which in turn is interlockingly coupled with the traveling clutch and the direct coupling clutch.

(3) The drive unit according to the present invention enables the vehicle body to turn in accordance with the output of the steering non-stage transmission unit that in turn is interlockingly coupled in a power transmission path through the left and right planetary gear mechanism, the steering non-stage transmission unit being so adapted as to change the speed in association with the pivotal operation of the steering wheel, and the power transmission path extending from the engine to the input shaft of the traveling part for driving the crawlers of the left and right traveling parts through the traveling non-stage transmission unit. For the drive unit according to the present invention, the left and right steering transmission parts so adapted as to change a speed in plural stages are interposed between the left and right planetary gear mechanisms and the steering non-stage transmission unit, respectively, so that the speed change operation of the left and right steering transmission parts is implemented so as to be associated with the pivotal operation of the steering wheel disposed in the operation part.

(4) The drive unit according to the present invention still has the feature in that the traveling auxiliary transmission part so adapted as to change a speed in plural stages is disposed in the power transmission path extending from the engine to the input shaft of the traveling part for driving the crawlers of the left and right traveling parts through the traveling non-stage transmission unit.

(5) The drive unit according to the present invention still further has the feature in that, when the traveling auxiliary transmission part is operated to change the speed toward a high speed side, the speed change operation of the left and right steering transmission parts is operated so as to be associated with the pivotal operation from the straight-forward traveling status of the steering wheel to decelerate the traveling speed of the traveling part inside the turning than the straight-forward traveling speed of the vehicle body, at least, by decreasing the speed of the steering transmission part inside the turning toward the low speed side. On the other hand, when the traveling auxiliary transmission part is operated to change the speed toward the low speed side, the speed change operation of the left and right steering transmission parts is operated so as to be associated with the pivotal operation from the straight-forward traveling status of the steering wheel to increase the traveling speed of the traveling part outside the turning than the straight-forward traveling speed of the vehicle body, at least, by decreasing the speed of the steering transmission part outside the turning toward the high speed side.

In the above figures, reference numerals and symbols have the following meanings, in which reference symbol E stands for an engine; reference symbol H for a hydrostatically traveling power transmission path; reference symbol M for a mechanically traveling power transmission path; reference symbols 1L and 1R for respectively left and right traveling parts; reference numeral 4 for an operation part; reference numeral 7 for a steering wheel; reference numeral 8 for a forward-rearward speed change lever; reference numeral 20 for a steering non-stage transmission unit; reference numeral 21 for a traveling non-stage transmission unit; reference symbol 21a for an input shaft of the traveling non-stage transmission unit; reference numeral 27 for a traveling clutch; reference numeral 28 for a traveling auxiliary transmission part; reference numeral 29 for an output shaft of the traveling auxiliary transmission part; reference numeral 30 for a direct coupling clutch; and reference symbols 38L and 38R for input shafts of the respectively left and right traveling parts.

BEST MODES FOR CARRYING OUT THE INVENTION

A drive unit according to the present invention is configured so as to transmit a power from a traveling non-stage transmission unit to left and right traveling parts through left and right planetary gear mechanism by changing the power into a non-stage and then changing the resulting power into plural stages, and so as to drive the left and right traveling parts by means of the revolution of left and right planetary gear mechanisms by interlocking coupling the internally-toothed gears of the traveling non-stage transmission unit with a steering non-stage transmission unit for changing the transmission ratio in association with a steering wheel, and by interlocking coupling the output shaft of the steering transmission unit with the left and right sun gears of the left and right planetary gear mechanisms through the steering transmission parts to rotate the left and right sun gears thereof in the directions opposite to each other. Further, the output shaft of the traveling non-stage transmission unit is interlockingly coupled with the input shaft of the traveling auxiliary transmission part, on the one hand, so as to be connected or disconnected therewith by means of a traveling clutch, and the input shaft of the traveling non-stage transmission unit is interlockingly coupled with the output shaft of the traveling auxiliary transmission part, on the other, so as to be connected or disconnected therewith by means of a direct coupling clutch, thereby performing the connection operation and the disconnection operation of each of the clutches by the operation of the forward-rearward speed change lever for operating the transmission ratio of the traveling non-stage transmission unit beyond its set position.

A description will be made of the embodiment of the present invention with reference to the accompanying drawings.

Figure 1:
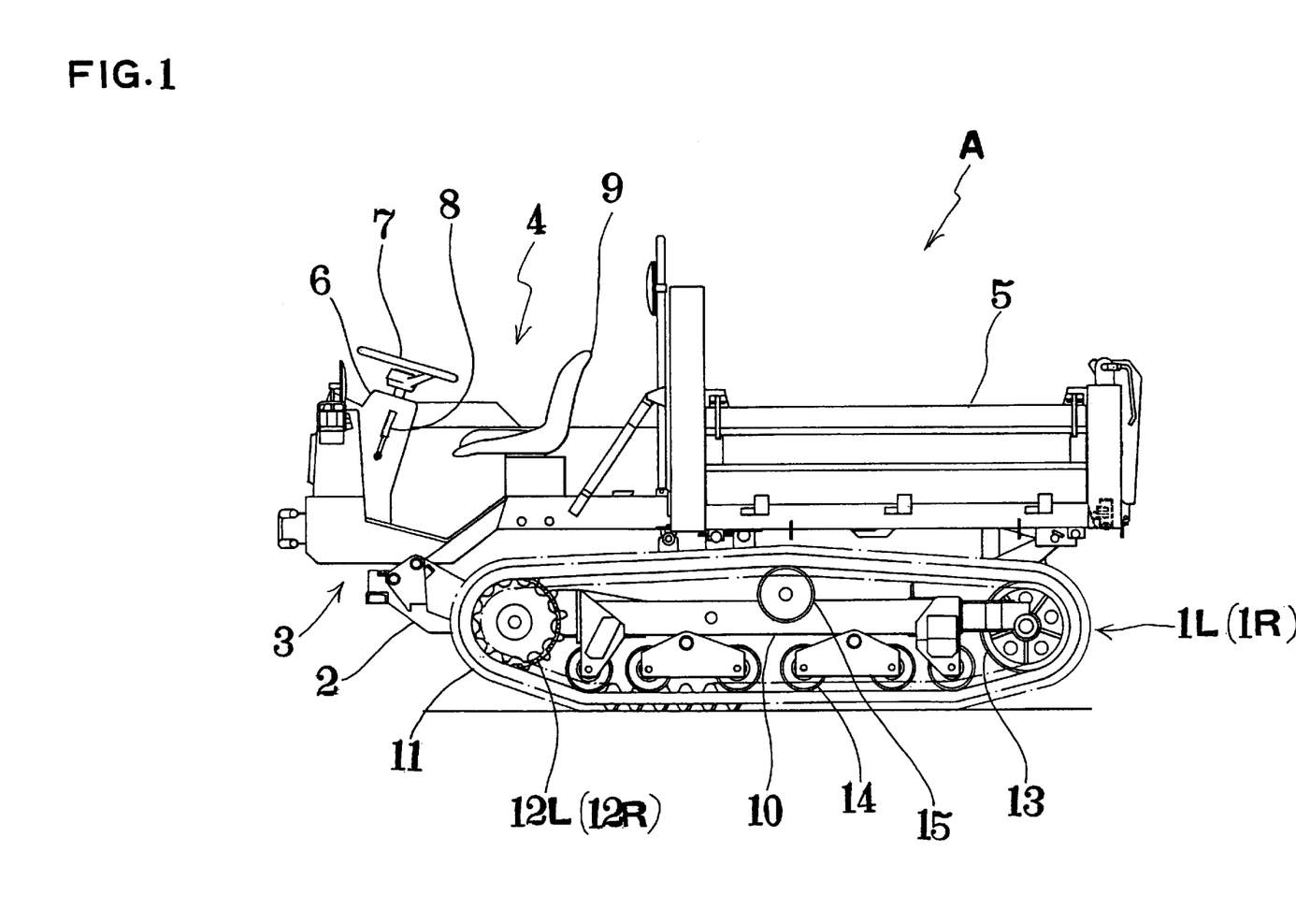
FIG. 1 is a side view showing a crawler working vehicle with the drive unit according to the present invention installed therein.

FIG. 1 is a side view showing a crawler working vehicle A with a drive unit according to the present invention installed therein. The crawler working vehicle A has left and right traveling parts 1L and 1R, each of a crawler type, disposed on the left and right sides of a vehicle frame 2, respectively, and is provided with an engine part 3 on the upper front portion of the vehicle frame 2 and with an operation part 4 on the upper front portion of the vehicle frame 2. On the rear portion of the operation part 4 is disposed a carrier 5 of a dumping type.

The operation part 4 has a steering column 6 disposed standing upright at its front portion. The steering column 6 is disposed with a steering wheel 7 so as to be steered and pivot, and provided on its left side surface with a forward-rearward speed change lever 8 so as to incline in forward and rearward directions. On the rear portion of the steering column 6 is disposed a seat 9 apart in a given distance therefrom. In FIG. 1, reference numeral 10 sets forth a traveling frame, reference numeral 11 sets forth a crawler, reference symbols 12L and 12R set forth left and right drive wheels, respectively, reference numeral 13 sets forth a non-driven wheel, and reference numerals 14 and 15 set forth lower and upper wheels.

Figure 2:
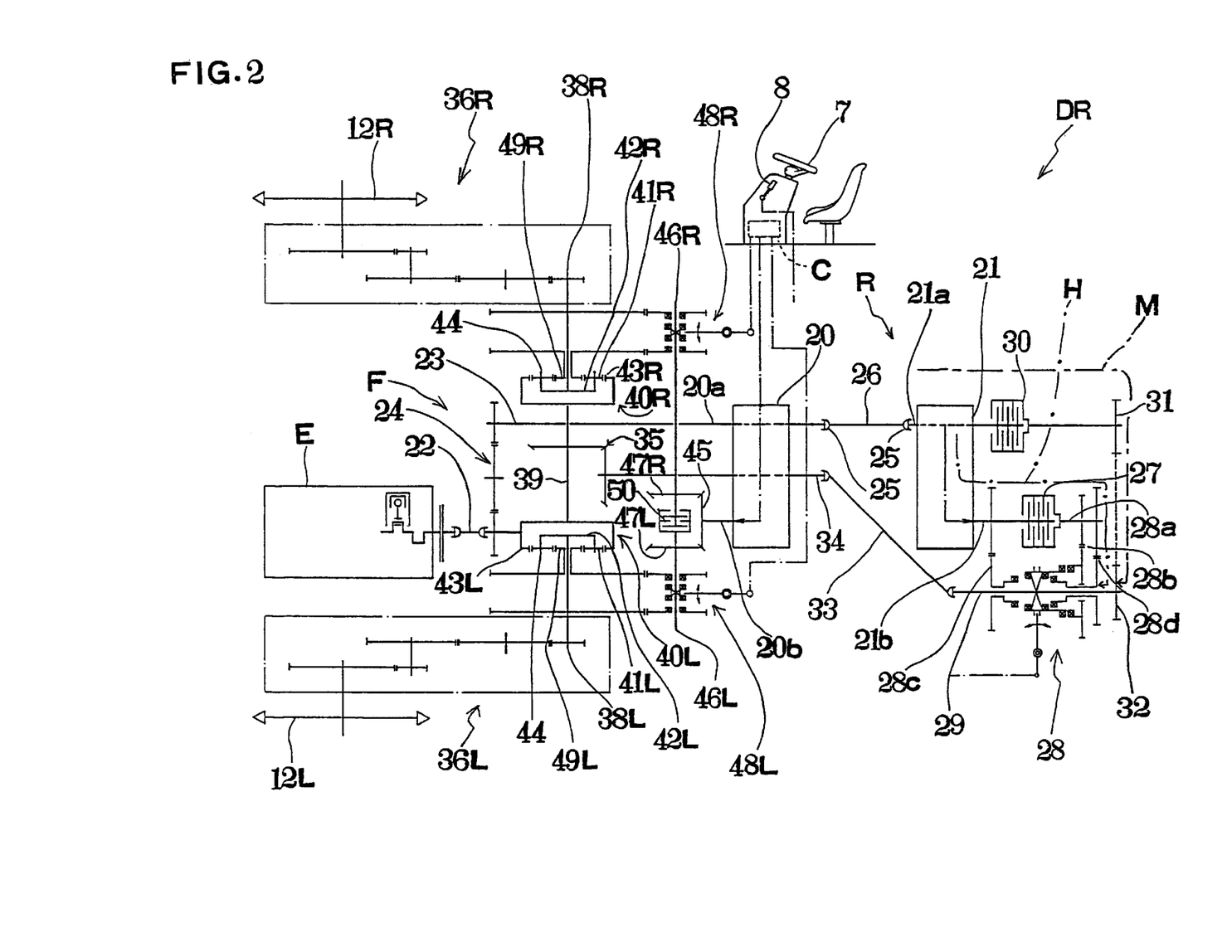
FIG. 2 is a view showing the construction of the drive unit according to the present invention.

FIG. 2 shows the construction of a traveling drive unit DR. As shown in FIG. 2, an engine E, a front transmission F, and a rear transmission R are disposed in this order from the front portion of the vehicle body. On the rear face of the front transmission F is mounted a steering non-stage transmission unit 20 of a hydrostatic type, comprising a variable volume hydraulic pump and a constant volume hydraulic motor. On the other hand, on the front face of the rear transmission R is mounted a traveling non-stage transmission unit 21 of a hydrostatic type, comprising a variable volume hydraulic pump and a constant volume hydraulic motor, in substantially the same manner as described above.

The operation of the steering wheel 7 and the forward-rearward speed change lever 8 is so carried out as to change a transmission ratio of the steering non-stage transmission unit 20 to the traveling non-stage transmission unit 21 by transmitting the power through a control unit C each to the steering non-stage transmission unit 20 and the traveling non-stage transmission unit 21.

Then, a description will be made of specific constructions of the drive unit DR in the order of transmitting the power.

The engine E and the input shaft 23 of the front transmission F are interlocking coupled with each other through a double-hook joint 22, and the input shaft 23 of the front transmission is interlockingly coupled with the front end of an input shaft 20a of the steering non-stage transmission unit 20 through a gear train 24. On the other hand, the rear end of the input shaft 20a of the steering non-stage transmission unit is interlockingly coupled with the front end of an input shaft 21a of the traveling non-stage transmission unit through a first coupling shaft 26 with a universal joint 25 disposed each on its both ends. Moreover, an output shaft 21b of the traveling non-stage transmission unit is interlockingly coupled with an output shaft 29 of the traveling auxiliary transmission part through a traveling clutch 27 disposed in the rear transmission R, an input shaft 28a of the traveling auxiliary transmission part 28, and first-speed, second-speed and third-speed engagement gears 28b, 28c and 28d, respectively.

The input shaft 21a of the traveling non-stage transmission unit 21 is interlockingly coupled at its rear end with a driving gear 31 through a wet multiple disc clutch as a direct coupling clutch 30, thereby engaging the driving gear 31 with a passive gear 32 that in turn is engaged with the rear end of the output shaft 29 of the traveling auxiliary transmission part.

The output shaft 29 of the traveling auxiliary transmission part 28 is interlockingly coupled at the front end thereof with a front input shaft 34 that in turn is supported on the rear face of the front transmission F through the universal joint 25 and a second coupling shaft 33, and it is further interlockingly coupled with an intermediate shaft 39 supported between input shafts 38L and 38R of the left and right traveling parts through a traveling engagement bevel gear 35 that in turn is formed at the front end of the front input shaft 34.

The intermediate shaft 39 is interlockingly coupled, on the one hand, with the input shaft 38L of the left traveling part 1L through a left planetary gear mechanism 40L and, on the other hand, with the input shaft 38R of the right traveling part 1R through a right planetary gear mechanism 40R. Further, the left planetary gear mechanism 40L is interlockingly coupled with the input shaft 38L of the left traveling part 1L engaged with the left driven wheel 12L through a left drive mechanism 36L for the left traveling part 1L, and the right planetary gear mechanism 40R is interlockingly coupled with the input shaft 38R of the right traveling part 1R engaged with the right driven wheel 12R through a right drive mechanism 36R for the right traveling part 1R.

The left planetary gear mechanism 40L comprises a left internally-toothed gear 43L engaged with the left end of the intermediate shaft 39, a left sun gear 49L engaged with the outer side end of a left differential shaft 48L as will be described hereinafter, and a left planetary gear 41L supported on a rotary shaft 44 of a left cage 42L engaged with the input shaft 38L of the left traveling part 1L. Likewise, the right planetary gear mechanism 40R comprises a right internally-toothed gear 43R engaged with the right end of the intermediate shaft 39, a right sun gear 49R engaged with the outer side end of a right differential shaft 48R as will be described hereinafter, and a right planetary gear 41R supported on a rotary shaft 44 of a right cage 42R engaged with the input shaft 38R of the right traveling part 1R. The left internally-toothed gear 43L is interlockingly coupled with the left sun gear 49L through the left planetary gear 41L in an engaged way, and likewise the right internally-toothed gear 43R is interlockingly coupled with the right sun gear 49R through the right planetary gear 41R in an engaged way.

On the other hand, a steering bevel gear 45 is mounted on the rear end of the output shaft 20b of the steering non-stage transmission unit 20 with which left and right steering passive bevel gears 47L and 47R are engaged, the left and right steering passive bevel gears 47L and 47R in turn being engaged with the inner side ends of left and right differential shafts 46L and 46R, respectively. The left and right differential shafts 46L and 46R are in turn interlockingly coupled with left and right sun gears 49L and 49R through left and right steering transmission parts 48L and 48R, respectively, each being disposed at the outer side end of the respective left and right differential shafts 46L and 46R.

The above configuration forms a hydrostatically travelling power transmission path H for transmitting the power via the hydrostatically speed-change operation of the traveling non-stage transmission unit 21 and a mechanically traveling power transmission path M for transmitting the power without the aid of the traveling non-stage transmission unit 21. The hydrostatically travelling power transmission path H extends from the engine E at the one end and continues up to the left and right sprockets 12L and 12R at the opposite end, the path starting from the engine E and extending to the input shaft 21a of the traveling non-stage transmission unit 21 from which it further extends to the output shaft 21b of the non-stage transmission unit 21 and then to the traveling auxiliary transmission part 28. The path further continues from the traveling auxiliary transmission part 28 to a second coupling shaft 33 and then to a front input shaft 34, the path extending through a traveling engagement bevel gear 35 to the intermediate shaft 39 that in turn is connected through the left and right internally-toothed gears 43L and 43R and the left and right planetary gears 41L and 41R to left and right cages 42L and 42R, respectively. The path then extends through the input shafts 38L and 38R of the left and right traveling parts to the left and right sprockets 12L and 12R, respectively. On the other hand, the mechanically traveling power transmission path M ranges from the engine E to the left and right sprockets 12L and 12R, respectively, the path starting from the engine E and extending through the input shaft 21a of the traveling non-stage transmission unit 21 to the direct-coupling clutch 30 that in turn is through the driving gear 31 and the passive gear 32 to the traveling auxiliary transmission part 28. The path further extends therefrom through the second coupling shaft 33 to the front input shaft 34. Then, the path from the front input shaft 34 extends through the traveling engagement bevel gear 35 to the intermediate shaft 39 that in turn is connected through the left and right internally-toothed gears 43L and 43R and the left and right planetary gears 41L and 41R to the left and right cages 42L and 42R, respectively. The path further continues from the left and right cages 42L and 42R through the input shafts 38L and 38R of the left and right traveling parts to the left and right sprockets 12L and 12R, respectively. The hydrostatically travelling power transmission path H is so adapted as to travel on a non-paved road because it can perform the smooth transmission operation while the transmission of the power is continued by the non-stage speed change operation. On the other hand, the mechanically traveling power transmission path M is so adapted as to travel on a road at a high speed because it can achieve a high efficiency in a power transmission in a high rotation region because it does not require the use of the traveling non-stage transmission unit 21.

Moreover, the power transmitted to the steering non-stage transmission unit 20 is transmitted from the output shaft 20b thereof through the steering drive bevel gear 45 and the left and right steering passive bevel gears 47L and 47R to the left and right differential shafts 46L and 46R, respectively. The power is then transmitted to the left and right steering transmission parts 48L and 48R, thereafter the power being transmitted through the left and right sun gears 49L and 49R and then through the left and right planetary gears 41L and 41R to the left and right cages 42L and 42R, respectively. The power is then transmitted from the left and right cages 42L and 42R to the input shafts 38L and 38R of the left and right traveling parts 1L and 1R, respectively.

Between the left and right differential shafts 46L and 46R is interposed a wet-type multiple disc clutch acting as a clutch member 50 that is so adapted as to be operated in accordance with the steering operation of the steering wheel 7. When the steering wheel 7 is located in the straight-forward traveling position, the left and right differential shafts 46L and 46R are coupled to each other through the clutch member 50 to hold the left and right differential shafts 46L and 46R at the suspended position, respectively. On the other hand, when the steering wheel 7 is operated in either direction, the left and right differential shafts 46L and 46R are so adapted as to rotate in the directions opposite to each other by the output of the steering non-stage transmission unit 20 by releasing the coupling between the left and right differential shafts 46L and 46R.

Therefore, as the power transmitted to the steering non-stage transmission unit 20 is transmitted to the direction in which the input shafts 38L and 38R of the left and right traveling parts 1L and 1R are rotated in the opposite directions, the speed of one of the input shafts of the traveling parts is increased, while the speed of the other is decreased. This produces a difference in the traveling speed between the left and right traveling parts 1L and 1R, thereby turning the vehicle body to the left or right.

Moreover, the steering non-stage transmission unit 20 and the left and right steering transmission parts 48L and 48R are operated to change the speed of the vehicle in association with the pivotal operation of the steering wheel 7, thereby making a pivot turn of the operating shaft outside the turning in the straight-forward traveling direction, while making a pivot turn of the operating shaft inside the turning in the rearward-traveling direction. With this configuration, the left and right steering transmission parts 48L and 48R are so adapted as to allow the traveling transmission part inside the turning to change the speed of the vehicle body toward the low-speed side when the traveling speed of the vehicle body thereof is high, on the one hand, and to allow the traveling transmission part outside the turning to change the speed thereof toward the high-speed side when the traveling speed thereof is low, upon the pivotal operation of the steering wheel 7 to either of the left and right directions to its full length.

Therefore, when the steering wheel 7 is located at the straight-forward traveling position, no difference in the traveling speeds is caused to occur between the left and right traveling parts 1L and 1R and the straight-forward traveling performance of the vehicle body can be sustained in a good condition, as the steering non-stage transmission unit 20 does not produce any output and, moreover, the stop state of the left and right differential shafts 46L and 46R is held forcibly by coupling the clutch member 50, even if the load of the left traveling part 1L differs from the load of the right traveling part 1R.

Upon the pivotal operation of the steering wheel 7 toward either of the left and right directions, the coupling of the clutch member 50 is released and the left and right differential shafts 46L and 46R are rotated in the direction opposite to each other, when the angle of operation is within a set angle. As a result, the vehicle body is turned toward the low-speed side at a turning radius in accordance with the angle of the operation of the steering wheel 7 by making the traveling speed of one of the traveling parts high and the traveling speed of the other thereof low.

When the angle of operation is within the set angle and the speed of the output shaft 21b of the non-stage transmission unit 21 is changed to the high-speed side, the speed of the steering transmission part inside the turning is changed to the low-speed side and the traveling speed of the vehicle body is reduced so that the vehicle body can be turned with safety. On the other hand, when the angle of operation is larger than the set angle and the speed of the output shaft 21b of the non-stage transmission unit 21 is changed toward the low-speed side, the speed of the steering transmission part outside the turning is changed to the high speed side, so that the vehicle can be turned quickly and sensitively in response to the operation of the steering wheel 7 without causing any decrease in the traveling speed. Moreover, a pivot turn of the vehicle body for turning the vehicle body about the vehicle body can be made by placing the steering transmission part on the low-speed side at the neutral state and suspending the traveling part on this side.

When the steering wheel 7 is operated to pivot to the full length in a state in which the forward-rearward speed change lever 8 is operated at the neutral position and the operation of the traveling non-stage transmission unit 21 is suspended, the left and right traveling parts 1L and 1R are rotated in the directions opposite to each other by the aid of the output of the steering non-stage transmission unit 20, thereby allowing a spin turn to turn the vehicle body at the minimal radius about the intermediate position of each traveling part.

When the forward-rearward steering lever 8 is operated to drive the vehicle in the forward or rearward direction, the coupling of the direct coupling clutch 30 is released and the power is transmitted to the left and right traveling parts 1L and 1R through the hydrostatically traveling power transmission path H for transmitting the power via the transmission operation of the traveling non-stage transmission unit 21. Therefore, a smooth transmission operation can be made by the non-stage speed change of the traveling non-stage transmission unit 21 while the power transmission suitable for the traveling on a non-paved road by the non-stage transmission of the traveling non-stage transmission unit 21.

Further, when the forward-rearward steering lever 8 is operated beyond the set position, the coupling of the direct coupling clutch 30 is continued and the power can be transmitted to the left and right traveling parts 1L and 1R via the mechanically traveling power transmission path M that can transmit the power without passage through the traveling non-stage transmission unit 21, so that the traveling can be effected on a paved road at a low fuel consumption suitable for traveling at a high speed.

A description will be made of the configuration of a traveling auxiliary transmission part 60 as another embodiment of the present invention with reference to FIGS. 3 and 4.

Figure 3:
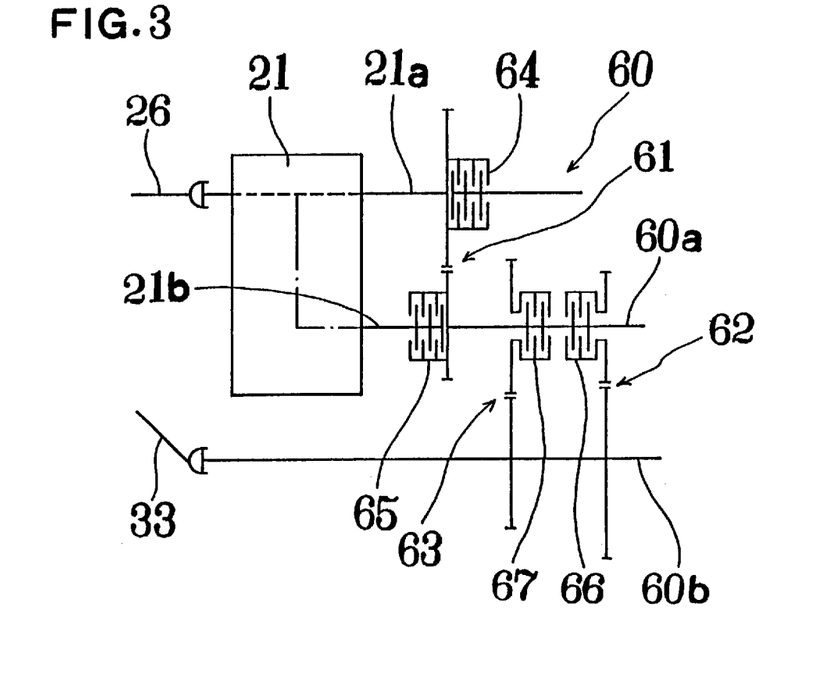
FIG. 3 is a view showing the construction of a rear transmission in another embodiment of the present invention.

As shown in FIG. 3, the traveling auxiliary transmission part 60 has an input engagement gear 61, interposed between the input shaft 21a of the traveling non-stage transmission unit 21 and a input shaft 60a of the traveling auxiliary transmission part 60, and first-speed and second-speed engagement gears 62 and 63, interposed between the input shaft 60a of the traveling auxiliary transmission part 60 and an output shaft 60b of the traveling auxiliary transmission part 60. Further, the input shaft 60a of the auxiliary transmission part 60 is interlockingly coupled with an input engagement gear 61 through the direct coupling clutch 64 so as to be connectable or disconnectable therewith, and the output shaft 21b of the traveling non-stage transmission unit 21 is interlockingly coupled with the input shaft 60a of the traveling auxiliary transmission part 60 through an input clutch 65 so as to be connectable or disconnectable. Moreover, the input shaft 60a of the traveling auxiliary transmission part 60 is interlockingly coupled with the first-speed engagement gear 62 and the second-speed engagement gear 63 through a first-speed clutch 66 and a second-speed clutch 67, respectively, so as to be connectable or disconnectable.

Therefore, the power transmission path through the traveling non-stage transmission unit 21 is so adapted as to effect an auxiliary speed change in two stages, while the power transmission path through the direct coupling clutch 64 is likewise so adapted as to effect an auxiliary speed change in two stages. This allows the auxiliary speed change totally in four stages. Therefore, the fuel consumption can be reduced by selecting the auxiliary transmission ratio optimally suitable for the traveling on a non-paved road or on a paved road.

Figure 4:
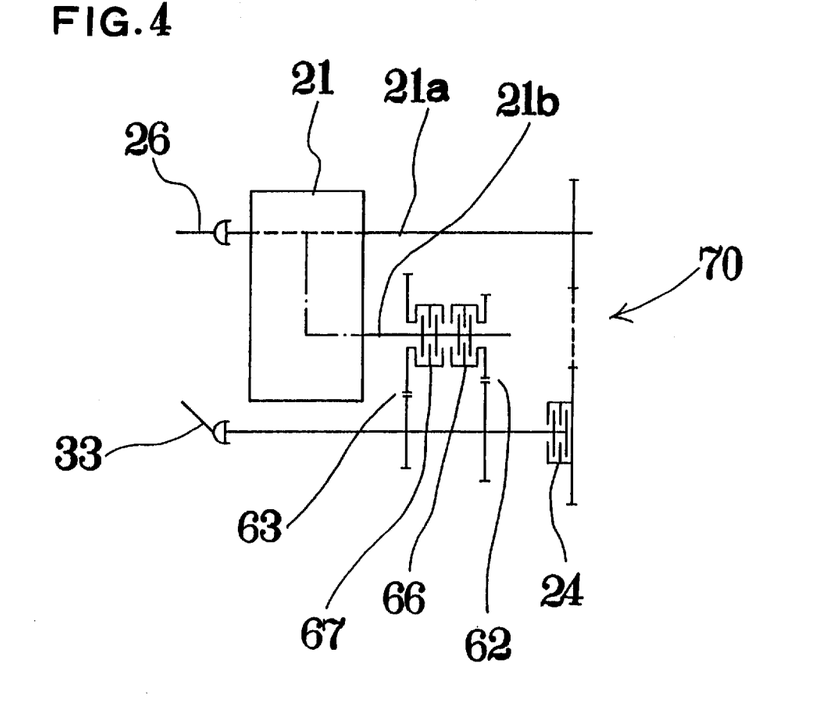
FIG. 4 is a view showing the construction of a rear transmission in another embodiment of the present invention.

As shown in FIG. 4, the input shaft 21a of the traveling non-stage transmission unit 21 is interlockingly coupled with the output shaft 21b of the non-stage transmission unit 21 through the direct-coupling engagement gear 70 and the direct coupling clutch 64 so as to be connectable or disconnectable. Further, the first-speed engagement gear 62 and the second-speed engagement gear 63 are interposed between the output shaft 21b of the traveling non-stage transmission unit 21 and the output shaft 60b of the traveling non-stage transmission unit 60, thereby interlockingly coupling the output shaft 21b of the traveling non-stage transmission unit 21 with the first-speed engagement gear 62 and the second-speed engagement gear 63 through the first-speed clutch 66 and the second-speed clutch 67, respectively, so as to be connectable or disconnectable, thereby permitting an auxiliary speed change operation in three stages.

In FIGS. 3 and 4, each of the clutches 64, 65, 66 and 67 is composed of a wet-type multiple disc clutch, thereby allowing the prevention of an occurrence of a shock at the time of operating the speed change.

Figure 5:
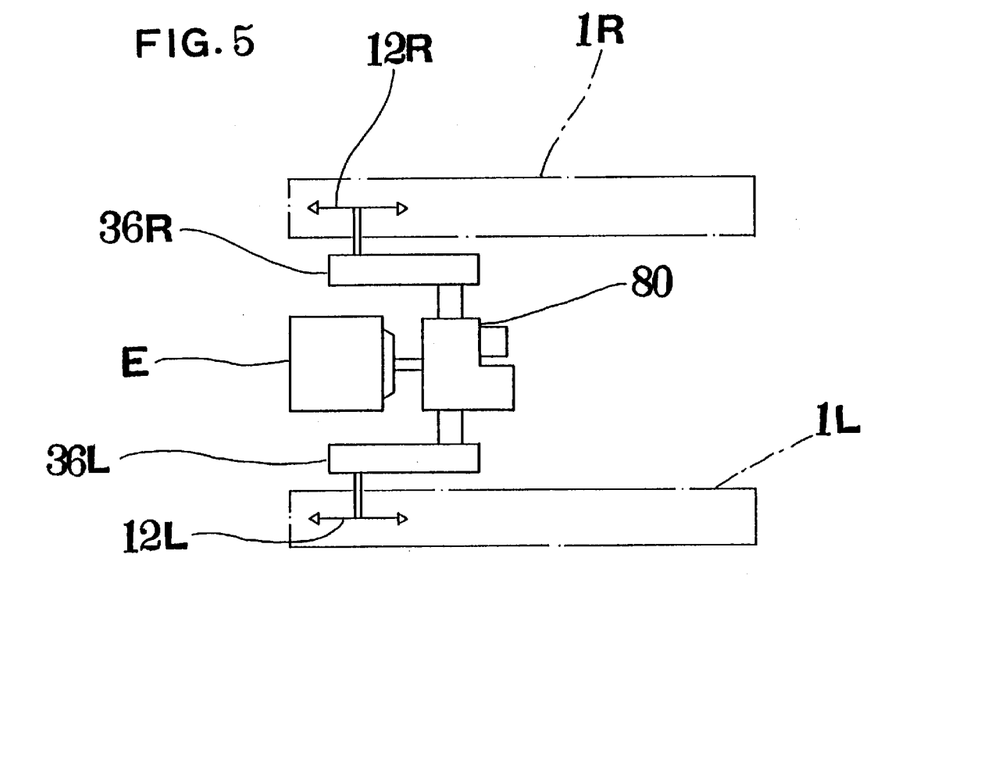
FIG. 5 is another example of the disposition of the drive unit according to the present invention.
Figure 6:
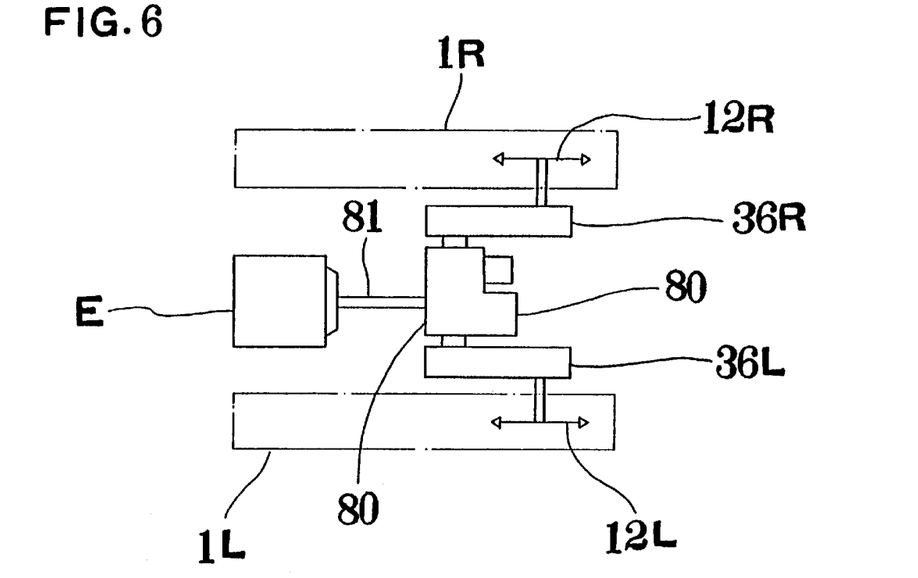
FIG. 6 is another example of the disposition of the drive unit according to the present invention.

FIGS. 5 and 6 show an example of the disposition of the power transmission system. FIG. 5 shows the power transmission system consisting of a combined transmission 80 that comprises an integral coupling of a front transmission with a rear transmission. The combined transmission 80 is located in the position nearby behind the engine E disposed at the front portion of the vehicle body so as to transmit the power to the left and right driven wheels 12L and 12R disposed at the front portion of the left and right traveling parts 1L and 1R, respectively.

As shown in FIG. 6, the engine E is disposed at the front portion of the vehicle body and the combined transmission 80 is disposed at the rear portion thereof. The engine E is interlockingly coupled with the combined transmission 80 through a propeller shaft 81 so as to transmit the power to the left and right driven wheels 12L and 12R disposed at the front portion of the left and right traveling parts 1L and 1R, respectively.

INDUSTRIAL UTILIZATION OF THE INVENTION

The present invention can offer the advantages as will be described hereinafter.

1. The present invention can control the number of output revolutions of the traveling non-stage transmission unit to a low level in accordance with the traveling status by interlockingly coupling the left and right sprockets with each other through the traveling non-stage transmission unit and the traveling auxiliary transmission part that enables the speed change in plural stages, the left and right sprockets being for driving the left and right crawlers of the left and right traveling parts, respectively. Further, the present invention enables the saving of a fuel consumption even while traveling at a high speed or at a low speed, by controlling the number of output revolutions of the traveling non-stage transmission unit to a low level.

2. The present invention forms the hydrostatically traveling power transmission path extending between the engine and the left and right sprockets and the mechanically traveling power transmission path extending between the engine and the left and right sprockets, the hydrostatically traveling power transmission path being formed by interlocking coupling the engine with the input shaft of the traveling non-stage transmission unit and the output shaft of the traveling non-stage transmission unit with the output shaft of the traveling auxiliary transmission part via the traveling clutch, and the output shaft of the traveling auxiliary transmission part with the left and right sprockets, and the mechanically traveling power transmission path being formed by interlockingly coupling the input shaft of the traveling non-stage transmission unit with the traveling auxiliary transmission part through the direct coupling clutch. The present invention further allows the transmission of the power through either one of the hydrostatically traveling power transmission path and the mechanically traveling power transmission path by selecting the either one by connecting or disconnecting each of the clutches. This configuration enables the smooth traveling on a non-paved road and the easy operation by selecting the hydrostatically traveling power transmission path that can change the speed in a non-stage while transmitting the power. On the other hand, upon traveling on a paved road at a high speed, a fuel consumption can be saved by selecting the mechanically traveling power transmission path that does not pass through the traveling non-stage transmission unit.

3. The present invention permits each of the traveling clutches to be connected or disconnected by interlockingly coupling the clutches and the direct coupling clutch with the forward-rearward speed change lever for changing the transmission ratio of the traveling non-stage transmission unit and operating the forward-rearward speed change lever, thereby enabling a ready selection of either one of the hydrostatically traveling power transmission path and the mechanically traveling power transmission path as well as a simplified construction that does not require a lever or other means for exclusive use in performing the such selection.

4. The present invention provides the drive unit that can turn the vehicle body in accordance with the output of the steering non-stage transmission unit for operating the speed change operation in association with the pivotal operation of the steering wheel, by interlockingly coupling the steering non-stage transmission unit through the left and right planetary gear mechanisms in the power transmission path extending from the engine to the input shaft of the traveling part for driving the crawlers of the left and right traveling parts via the traveling non-stage transmission unit. The drive unit according to the present invention has the left and right steering transmission parts interposed between the left and right planetary gear mechanisms and the steering non-stage transmission unit so as to associate the speed change operation of the left and right steering transmission parts with the pivotal operation of the steering wheel disposed in the operation portion, so that the output from the steering non-stage transmission unit to the left and right planetary gear mechanisms can transmitted by changing the speed discreetly and separately by means of the left and right steering transmission parts. This configuration enables a pivot turn to be made, for example, by suspending the movement of one of the traveling parts and driving the other of them only and a spin turn to be made, for example, by driving the left and right traveling parts in the directions opposite to each other, thereby enhancing the turning performance of the vehicle body.

Further, this configuration enables the above turn only by the pivotal operation of the steering wheel, so that the maneuvering of the vehicle body can be effected easily. Moreover, it can simplify the construction of the vehicle body because this configuration does not require the use of a lever for exclusive use in effecting the speed change operation of the left and right steering transmission parts.

5. The drive unit according to the present invention can travel the vehicle in a speed region that cannot be covered only by the traveling non-stage transmission unit because the traveling auxiliary transmission part that allows the speed change in plural stages is disposed in the power transmission path extending from the engine to the input shaft of the traveling parts for driving the left and right crawlers of the left and right traveling parts through the traveling non-stage transmission unit. Moreover, this drive unit can save the fuel consumption by lowering the number of output revolutions of the traveling non-stage transmission unit during the traveling on a paved road at a high speed.

6. The drive unit according to the present invention can reduce the traveling speed of the vehicle during the turning by reducing the traveling speed of the traveling part inside the turning than the straight-forward traveling speed of the vehicle body, at least, by changing the speed of the steering transmission part inside the turning to the low speed side by associating the speed change operation of the left and right steering traveling parts with the pivotal operation of the steering wheel from the forward traveling status, when the traveling auxiliary transmission part is operated so as to change the speed toward the high speed side. This configuration also makes slower the reaction of the turning operation of the vehicle body to the operation by the steering wheel. The decrease in the traveling speed of the vehicle during the turning and the slow reaction of the vehicle to the turning operation can turn the vehicle with high safety.

On the other hand, when the traveling auxiliary transmission part is operated to change the speed toward the low speed side, the speed change operation is associated with the pivotal operation of the steering wheel from its straight-forward traveling status and, at least, the speed of the steering traveling part outside the turning is changed toward the high speed side to increase the traveling speed of the traveling part outside the turning than the straight-forward traveling of the vehicle. This configuration can increase the traveling speed of the vehicle and can make the reaction of the turning of the vehicle body to the operation of the steering wheel sensitive, together with the turning operation by means of the steering non-stage transmission unit. This enables a quick turn of the vehicle.

What is claimed is:

1. A drive unit for a crawling working vehicle, wherein:
a traveling non-stage transmission unit (21) and a traveling auxiliary transmission part (28) are interposed between an engine (E) and left and right sprockets (12L and 12R) for driving left and right crawlers (11 and 11) of left and right traveling parts (1L and 1R), respectively;
a hydrostatically traveling power transmission path (H) for transmitting a power via a hydrostatically speed change operation of said traveling non-stage transmission unit (21) and a mechanically traveling power transmission path (M) for transmitting a power without passage through said traveling non-stage transmission unit (21) are formed; and
a traveling power is transmitted through either one of said hydrostatically traveling power transmission path (H) and said mechanically traveling power transmission path (M) by selecting said either one of said hydrostatically traveling power transmission path (H) and said mechanically traveling power transmission path (M).

2. The drive unit as claimed in claim 1, wherein:
said hydrostatically traveling power transmission path (H) is formed between said engine (E) and said left and right sprockets (12L and 12R) by interlockingly coupling said engine (E) with an input shaft (21a) of said traveling non-stage transmission unit (21), an output shaft (21b) of said traveling non-stage transmission unit (21) with an output shaft (29) of said traveling auxiliary transmission part (28) through a traveling clutch (27); and said output shaft (29) of said traveling auxiliary transmission part (28) with said left and night sprockets (12L and 12R); and
said mechanically traveling power transmission path (M) is formed between said engine (E) and said left and right sprockets (12L and 12R) by interlockingly coupling said input shaft (21a) of said traveling non-stage transmission unit (21) and said auxiliary transmission part (28) through a direct coupling clutch (30); and
said traveling power is transmitted by selecting either of said hydrostatically traveling power transmission path (H) and said mechanically traveling power transmission path (M) by connecting or disconnecting each of said clutches (27) and (30).

3. The drive unit as claimed in claim 1, wherein:
a traveling clutch (27) and a direct coupling clutch (30) are interlockingly coupled with a forward-rearward speed change lever (8) for changing a transmission ratio of said traveling non-stage transmission unit (21); and
each of said traveling clutch (27) and said direct coupling clutch (30) is connected or disconnected by operating said forward-rearward speed change lever (8).

4. The drive unit as claimed in claim 1, wherein
a steering non-stage transmission unit (20) for operating the speed change of the vehicle in association with the pivotal operation of a steering wheel (7) is interlockingly coupled through left and right planetary gear mechanism (40L and 40R) in a power transmission extending said engine (E) through said traveling non-stage transmission unit (21) to said input shafts (38L and 38R) of said traveling parts (1L and 1R) for driving said left and right crawlers (12L and 12R) of said left and right traveling parts (1L and 1R), respectively, to turn the vehicle in accordance with an output of said steering non-stage transmission unit (20);

said left and right transmission parts (48L and 48R) each for effecting a speed change in plural stages are interposed between said left and right planetary gear mechanisms (40L and 40R), respectively; and a traveling speed of the traveling part (1L or 1R) inside the turning is reduced to a speed slower than a straight-forward traveling speed of the vehicle, at least, by associating the speed change operation of said left and right steering transmission parts (48L and 48R) with a pivotal operation of said steering wheel (7) from its straight-forward traveling state and effecting the speed change operation of said steering transmission part (48L or 48R) to a low speed side, on the one hand, when said traveling auxiliary transmission part (28) is operated to change a speed of the vehicle to a high speed side, and a traveling speed of the traveling part (1L and 1R) outside the turning is increased to a speed higher than the straight-forward traveling speed of the vehicle, at least, by associating the speed change operation of said left and right steering transmission parts (48L and 48R) with the pivotal operation of said steering wheel (7) from its straight-forward traveling state and effecting the speed change operation of said steering transmission part (48L or 48R) to a low speed side, on the other hand, when said traveling auxiliary transmission part (28) is operated to change a speed of the vehicle to a low speed side.

\* \* \* \* \*